(12) United States Patent
Fujiwara

(10) Patent No.: US 10,692,182 B2
(45) Date of Patent: Jun. 23, 2020

(54) CONTROLLING PROGRAM AND INFORMATION PROCESSING APPARATUS

(71) Applicant: BROTHER KOGYO KABUSHIKI KAISHA, Nagoya, Aichi (JP)

(72) Inventor: Susumu Fujiwara, Aichi (JP)

(73) Assignee: Brother Kogyo Kabushiki Kaisha, Nagoya, Aichi (JP)

( * ) Notice: Subject to any disclaimer, the term of this patent is extended or adjusted under 35 U.S.C. 154(b) by 373 days.

(21) Appl. No.: 15/386,179

(22) Filed: Dec. 21, 2016

(65) Prior Publication Data
US 2017/0186134 A1 Jun. 29, 2017

(30) Foreign Application Priority Data

Dec. 25, 2015 (JP) ................. 2015-253534

(51) Int. Cl.
*G06F 3/048* (2013.01)
*G06T 3/40* (2006.01)
*G06T 11/60* (2006.01)
*G06F 3/0482* (2013.01)
(Continued)

(52) U.S. Cl.
CPC .......... *G06T 3/4038* (2013.01); *G06F 3/0482* (2013.01); *G06T 11/60* (2013.01); *H04N 1/00411* (2013.01); *H04N 1/00424* (2013.01); *H04N 1/00427* (2013.01);
(Continued)

(58) Field of Classification Search
CPC ...... G06T 3/4038; G06T 11/60; G06F 3/0482
See application file for complete search history.

(56) References Cited

U.S. PATENT DOCUMENTS 6,271,840 B1 * 8/2001 Finseth ................. G06F 16/951
715/236
6,597,378 B1 * 7/2003 Shiraishi ............... G06F 3/0481
715/733
(Continued)

FOREIGN PATENT DOCUMENTS

JP 9-185485 A 7/1997
JP 2002214972 A 7/2002

OTHER PUBLICATIONS

Japanese Office Action dated Aug. 20, 2019 issued in application No. 2015-253534.

*Primary Examiner* — Nicholas Augustine
(74) *Attorney, Agent, or Firm* — Scully, Scott, Murphy & Presser, PC

(57) ABSTRACT

A non-transitory computer readable medium storing computer readable instructions that are executable by a computer in an information processing apparatus having a display device is provided. The computer readable instructions, when executed by the computer, cause the computer to determine a format to display at least one setup item, which is required in order to accomplish a predetermined process, in the display device between an icon format, in which the at least one setup item is displayed in a figurative image containing a symbolic figure representing the at least one setup item, and a list format, in which the at least one setup item is displayed in a textual image containing text describing the at least one setup item. The computer readable instructions further cause the computer to control the display device to display the at least one setup item in the determined format.

10 Claims, 9 Drawing Sheets

(51) Int. Cl.
*H04N 1/00* (2006.01)
*G06F 3/01* (2006.01)

(52) U.S. Cl.
CPC ..... *H04N 1/00474* (2013.01); *G06T 2200/24* (2013.01); *G06T 2210/32* (2013.01); *H04N 2201/0094* (2013.01)

(56) References Cited

U.S. PATENT DOCUMENTS

| | | | | |
|---|---|---|---|---|
| 7,581,176 | B2* | 8/2009 | Wilson | G06F 40/174 |
| | | | | 715/243 |
| 8,381,122 | B2* | 2/2013 | Louch | G06F 3/0481 |
| | | | | 715/784 |
| 8,819,575 | B2* | 8/2014 | Kim | G06F 3/04883 |
| | | | | 715/777 |
| 9,213,477 | B2* | 12/2015 | Singhal | G06F 3/0488 |
| 2001/0035883 | A1* | 11/2001 | Kobayashi | G06F 3/0481 |
| | | | | 715/810 |
| 2002/0063697 | A1 | 5/2002 | Amano | |
| 2003/0064757 | A1* | 4/2003 | Yamadera | G06F 3/0482 |
| | | | | 455/566 |
| 2005/0223324 | A1* | 10/2005 | Tashiro | G03G 15/5016 |
| | | | | 715/273 |
| 2013/0181941 | A1* | 7/2013 | Okuno | G06F 3/041 |
| | | | | 345/174 |
| 2015/0331572 | A1* | 11/2015 | Mischke | G06F 3/0486 |
| | | | | 715/769 |
| 2015/0347739 | A1* | 12/2015 | Matsushima | G06F 21/34 |
| | | | | 726/20 |

* cited by examiner

CONTROLLING PROGRAM AND INFORMATION PROCESSING APPARATUS

CROSS REFERENCE TO RELATED APPLICATION

This application claims priority from Japanese Patent Application No. 2015-253534, filed on Dec. 25, 2015, the entire subject matter of which is incorporated herein by reference.

BACKGROUND

Technical Field

An aspect of the present invention relates to a controlling program to be executed on an image processing apparatus having a display.

Related Art

An information processing apparatus having a display unit, which may display setup items that may be designated to execute various kinds of processes including a printing process and a scanning process to present to a user, is known. A setup item is a setting or preference that may be designated to satisfy a setup requirement in order to accomplish a process in the information processing apparatus. A setup requirement may include at least one setup item or a plurality of options of setup items to be designated. The at least one setup item may be displayed in a format of, for example, a list or an icon in the display unit. Through the setup items displayed in the icon format, the user may grasp contents of the settings intuitively when a quantity of the setup items is smaller. On the other hand, through the setup items displayed in the list format, the user may read through the list of options displayed in the display unit.

SUMMARY

The format of displaying the setup items may be fixed in advance and may not be presented to be changeable by users. However, there may be a case, for example, in which the options of setup items are displayed in the list format even if the quantity of the setup items is small, and the user would find the setup items displayed in the icon format more preferable. For another example, there may be case, in which the setup items are displayed in the icon format even if the quantity of the setup items is large, and the user would find the setup items displayed in the list format more preferable. In other words, the setup items may not always be displayed in the preferable format, and the user may find the fixed displaying format inconvenient.

The present invention is advantageous in that an information processing apparatus, in which the setup items may be displayed in a preferable format, is provided.

According to an aspect of the present disclosure, a non-transitory computer readable medium storing computer readable instructions that are executable by a computer in an information processing apparatus having a display device is provided. The computer readable instructions, when executed by the computer, cause the computer to determine a format to display at least one setup item, which is required in order to accomplish a predetermined process, in the display device between an icon format, in which the at least one setup item is displayed in a figurative image containing a symbolic figure representing the at least one setup item, and a list format, in which the at least one setup item is displayed in a textual image containing text describing the at least one setup item. The computer readable instruction further causes the computer to control the display device to display the at least one setup item in the determined format.

According to another aspect of the present disclosure, an information processing apparatus, having a display device and a controller is provided. The controller is configured to determine a format to display at least one setup item, which is required in order to accomplish a predetermined process, in the display device between an icon format, in which the at least one setup item is displayed in a figurative image containing a symbolic figure representing the at least one setup item, and a list format, in which the at least one setup item is displayed in a textual image containing text describing the at least one setup item. The controller further controls the display device to display the at least one setup item in the determined format.

BRIEF DESCRIPTION OF THE ACCOMPANYING DRAWINGS

DETAILED DESCRIPTION

[Configuration of Communication System]

Figure 1:
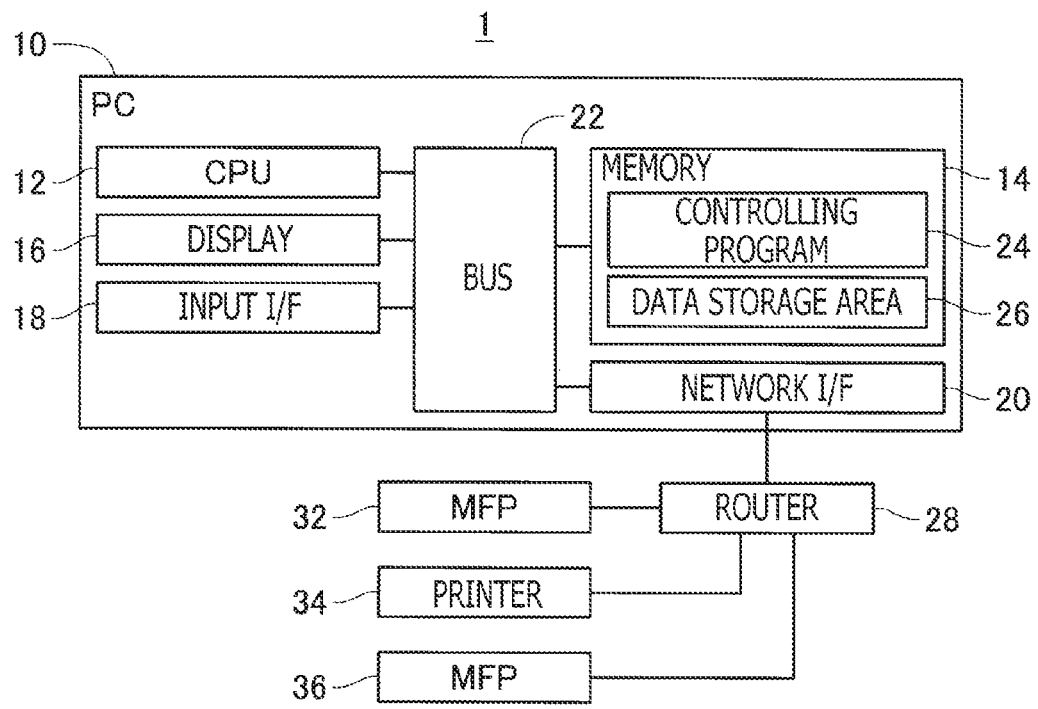
FIG. 1 is a block diagram to illustrate a configuration of a communication system 1 according to an embodiment of the present disclosure.

Hereinafter, an exemplary configuration of a communication system 1 will be described with reference to the accompanying drawings. The communication system 1 includes a PC 10, a multifunction peripheral (MFP) 32, a printer 34, and an MFP 36.

The PC 10 includes a central processing unit (CPU) 12, a memory 14, a display 16, an input interface (I/F) 18, and a network OF 20, which are connected with one another to communicate through a buss 22.

The CPU 12 executes various kinds of processes, including a printing process, according to controlling programs 24 stored in the memory 14. In the following description, the CPU 12 that runs the controlling program 24 may be referred to by a name of the program. For example, a phrase such as "the controlling program 24 executes a step" may mean "the CPU 12 that runs the controlling program 24 executes a step."

The memory 14 may include a random access memory (RAM), a read-only memory (ROM), a flash memory, a hard disk drive (HDD), and a buffer embedded in the CPU 12. The memory 14 includes a data storage area 26, in which data required to execute the controlling program 24 may be stored.

Figure 2:
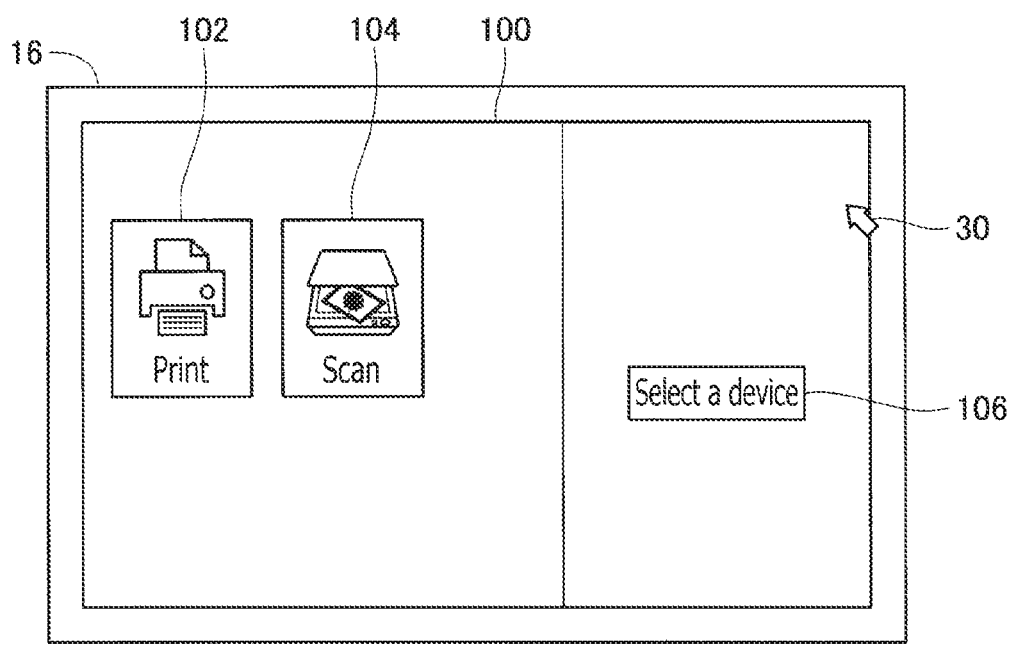
FIG. 2 is an illustrative view of a first top screen 100 according to the embodiment of the present disclosure.

The display 16 may display variety kinds of screens according to image data in the PC 10. The display 16 may include, but not necessarily be limited to, a liquid crystal display (LCD) and an organic electro-luminescence (EL) display. The input I/F 18 includes a keyboard and a mouse, which are not shown. The keyboard may include keys that may be operated to activate various kinds of functions in the PC 10. The mouse may be operated to manipulate a cursor 30 (see FIG. 2) displayed in the display 16. The input I/F 18 may be a touch-sensitive panel formed integrally with the display 16. The input I/F 18 may accept the user's operation, e.g., a touch, to an object such as an icon displayed on the display 16.

The network I/F 20 may interact with external devices to communicate and is connected with the printer 32 and the MFPs 32, 36. Thus, the PC 10 may exchange data with the printer 34 and the MFPs 32, 36 through the network I/F. In the present embodiment, the MFP 32 may execute the printing process and the scanning process. The printer 34 may execute the printing process but may not execute the scanning process. The MFP 36 may execute the printing process, the scanning process, and a facsimile transmission/receiving process.

[Processes with External Devices]

The PC 10 is connected with external devices including the MFP 32, 36, and the printer 34 through a router 28, and the various kinds of processes may be executed in conjunction with the external devices. That is, the PC 10 may transmit an instruction to one of the external devices to manipulate the external device to execute the process. For example, the PC 10 may display a first top screen 100 (see FIG. 2) on the display 16. The first top screen 100 may include an icon 102 for printing process, an icon 104 for scanning process, and a device selector button 106. The icon 102 for printing process is an operation icon, through which the printing process may be activated. The icon 104 for scanning process is an operation icon, through which the scanning process may be activated.

The device selector button 106 is an operation button, through which an external device to execute the process may be selected. The user may operate the device selector button 106 by, for example, clicking a button on the left of the mouse while the cursor 30 is placed over the device selector button 106. For another example, if the display 16 is a touch-sensitive panel, an operation to the device selector button 106 may be entered by the user's touch with, for example, a finger to an area, in which the device selector button 106 is displayed. When the device selector button 106 is operated, the devices connected with the PC 10 are searched, and a selector screen 110 (see FIG. 3), through which one of the devices found by the search is selectable, is displayed.

Figure 3:
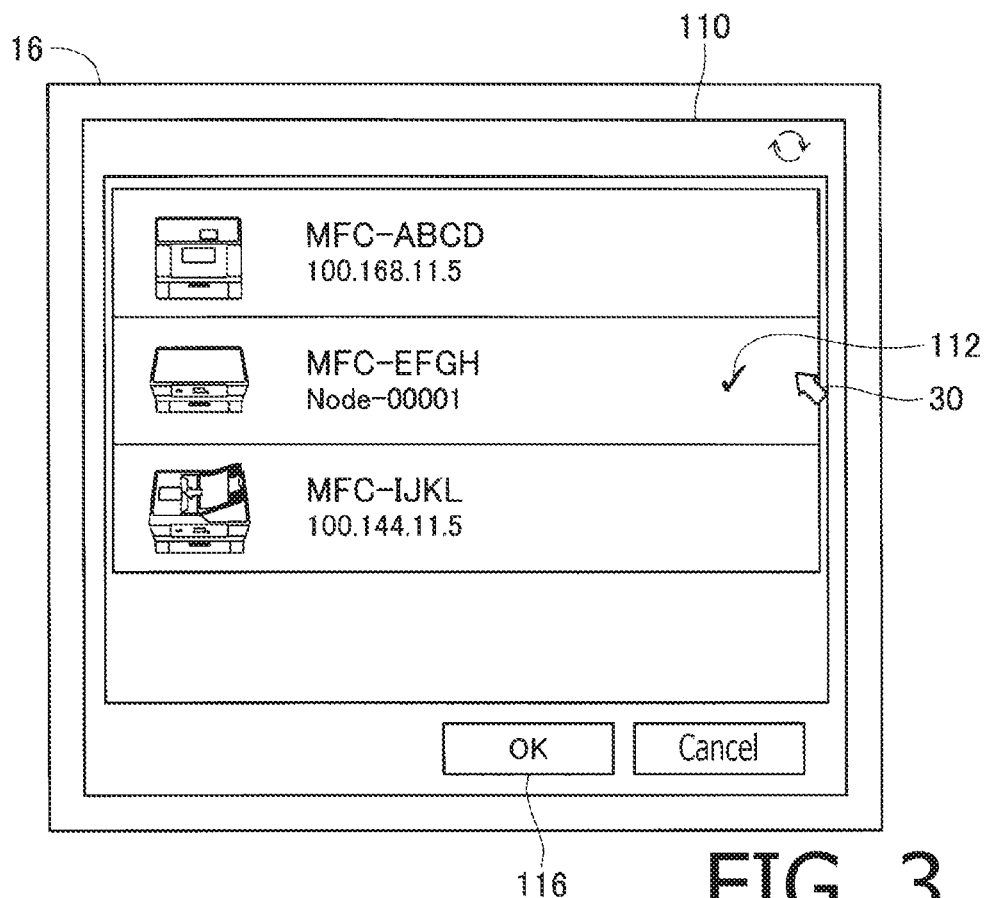
FIG. 3 is an illustrative view of a selector screen 110 according the embodiment of the present disclosure.

Specifically, when the device selector button 106 is operated, device information concerning the devices that are connected with the network I/F 20 is collected. The device information may include information concerning model identification and information concerning a process that is executable by the device. In the following description, the information concerning a process that is executable by the device may be called as process information. When the device information is collected, text strings corresponding to the model identification contained in the collected device information is displayed on the device basis. For example, as shown in FIG. 3, the selector screen 110 may be divided into a plurality of display fields, and a text string corresponding to a model number may be displayed in each of the display fields in the selector screen 110. The model number may include numerical figures, alphabet, and other characters. The user may designate one of the display fields corresponding to one of the model numbers, and when the user's designation is entered, a checkmark 112 may be displayed in the designated display field. With the checkmark 112 being displayed, i.e., while one of the devices is selected, when an OK button 116 is operated, the selected device is set as the device to execute the process.

Figure 4:
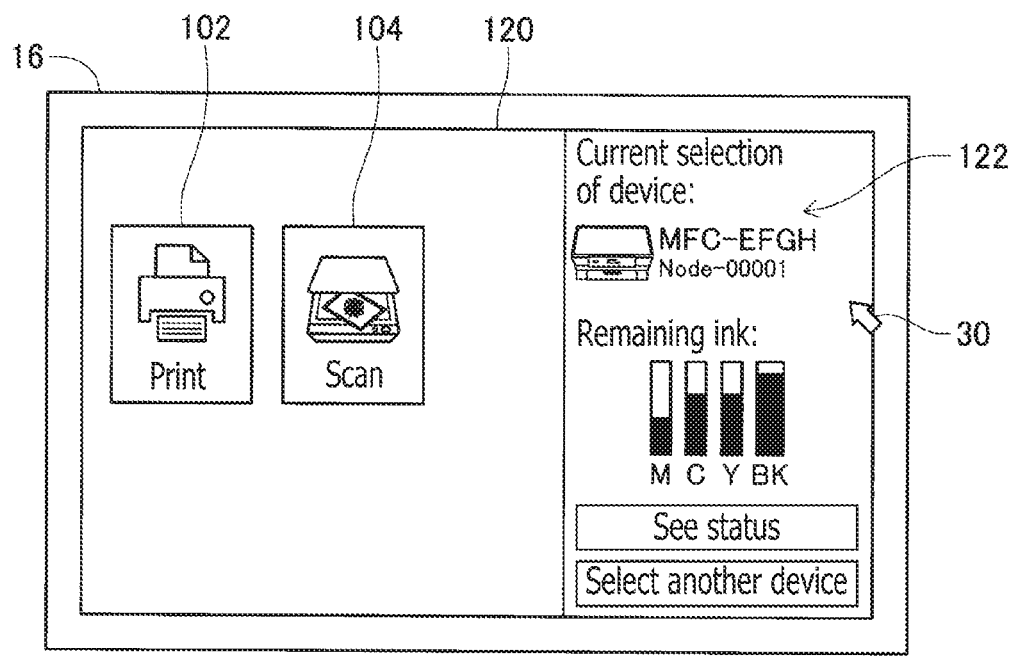
FIG. 4 is an illustrative view of a second top screen 120 according to the embodiment of the present disclosure.

Thereafter, the PC 10 displays a second top screen 120 (see FIG. 4) in the display 16. The second top screen 120 may display operation icons corresponding to processes that may be executable by the device selected through the selector screen 110. In the following description, the device selected through the selector screen 110 may be called as a selected device. As mentioned above, the device information includes the process information; therefore, the processes that may be executable by the selected device may be identified based on the process information. Accordingly, an operation icon corresponding to the identified executable process is displayed in the second top screen 120. For example, the MFP 32 that may execute the printing process and the scanning process may be selected through the selector screen 110. Based on the process information contained in the device information obtained from the MFP 32, the printing process and the scanning process may be identified as the executable processes. Therefore, as shown in FIG. 4, the icon 102 for printing process and the icon 104 for scanning process may be displayed in the second top screen 120. Meanwhile, the second top screen 120 further includes a selected device display area 122, in which information concerning the selected device, such as the model number, may be displayed based on the model identification contained in the device information.

Figure 5:
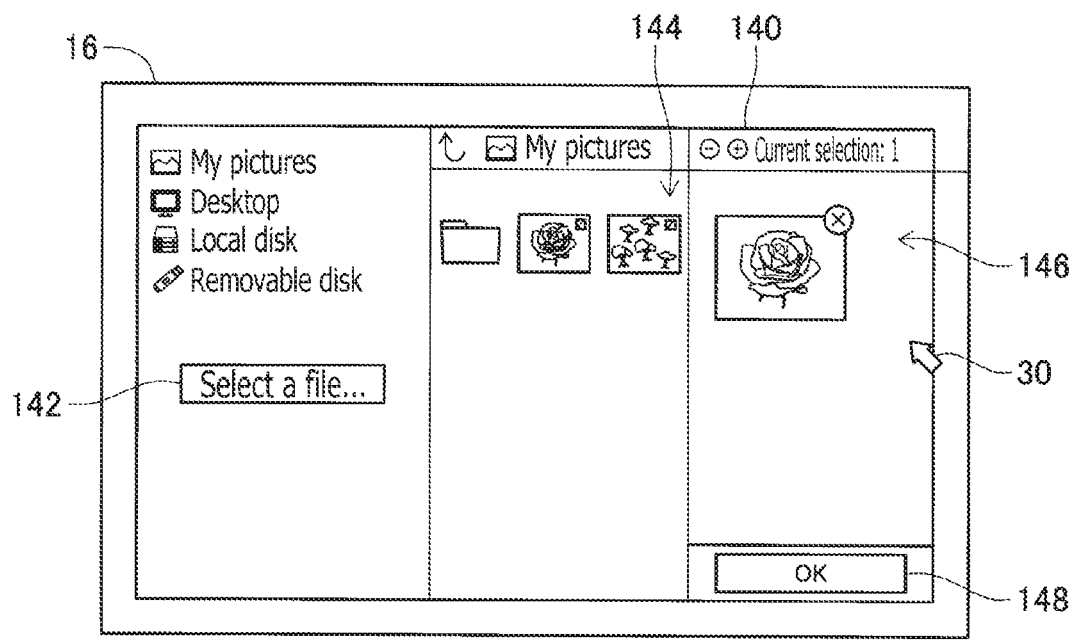
FIG. 5 is an illustrative view of an image selector screen 140 according the embodiment of the present disclosure.

Through the second top screen 120, if the user wishes to have an image printed on a sheet, the icon 102 for printing process may be operated. When the icon 102 for printing process is operated, an image selector screen 140 (see FIG. 5) is displayed in the display 16. The image selector screen 140 may include a file selector button 142. With an operation to the file selector button 142, the user may select a file containing image data among, for example, a plurality of data files. When a file containing image data is selected, one or more images corresponding to the image data in the file may be displayed in a first image display area 144. The user may select one of the images displayed in the first image display area 144, and the selected image is displayed in a second image display area 146. While the selected image is displayed in the second image display area 146, when an OK button 148 is operated by the user, the selected image is set to be an image to be processed to be printed.

With the operation to the OK button 148 through the image selector screen 140, information concerning a setup requirement is obtained. The setup requirement is a requirement for a setup item to be designated in order to accomplish the printing process in the selected device. The setup requirement information may be stored in each external device, and, upon the operation to the OK button 148, the PC 10 may communicate with the selected device and obtain the setup requirement information from the selected device. The obtained setup requirement information may be stored in the data storage area 26.

Figure 6:
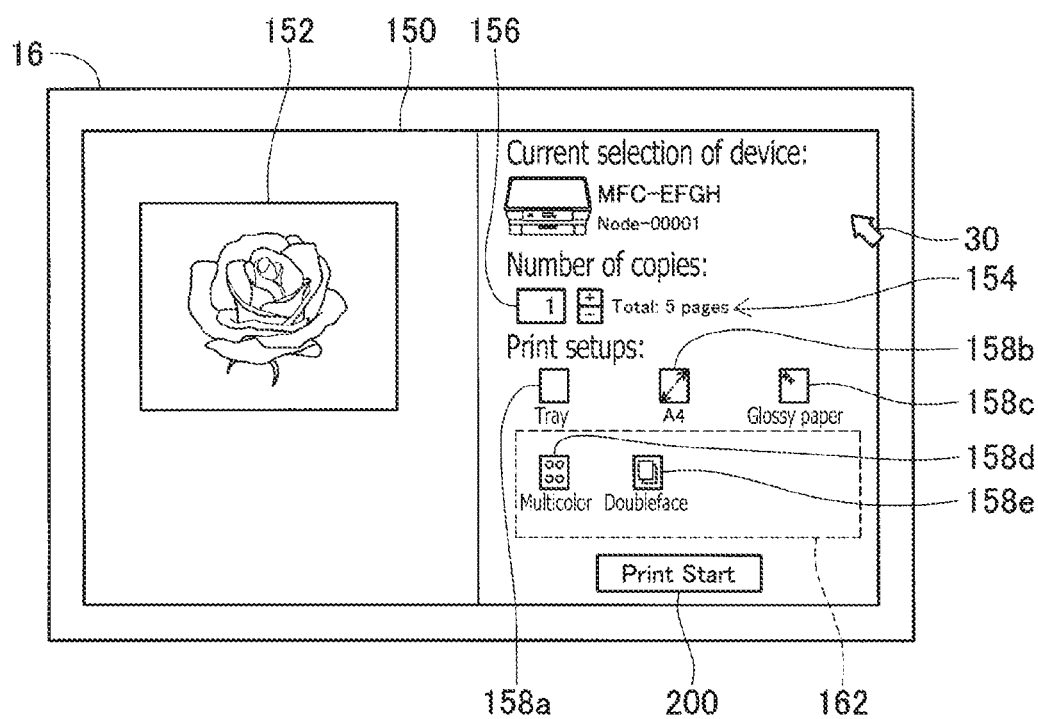
FIG. 6 is an illustrative view of a print requirement setup screen 150 according to the embodiment of the present disclosure.

Upon the operation to the OK button 148 through the image selector screen 140, further, the display 160 displays a print requirement setup screen 150 (see FIG. 6). The print requirement setup screen 150 may include an image 152 designated through the image selector screen 140 and a print requirement setup area 154, through which setups for printing required to accomplish the printing process to print the image may be designated by the user. The print requirement setup area 154 may include a copy quantity setup field 156, through which a quantity of copies to be printed may be designated, and a plurality of icons 158, through which the setups for printing may be designated. The icons 158 may be displayed in the print requirement setup area 154 based on the setup requirement information obtained by the operation to the OK button 148.

The setup requirement information may include one or more setup requirements. Each setup requirement includes at least one setup item to be designated. In other words, a setup requirement may be a group of options of setup items, one of which is required be designated to accomplish the printing process. For example, the setup requirement may require a setup for a sheet size. For another example, the setup requirement may require a setup for a sheet type. The setup requirement for sheet size may include options of setup items of A3, A4, etc. The setup requirement for sheet type may include options of setup items of glossy paper, regular paper, etc. Among the plurality of options of the setup items, one of the setup items may be designated by the user's operation. For example, concerning the setup requirement for sheet size, one specific size (e.g., A4) may be selected by the user. Thus, the group of the setup items may include one or more setting options, and solely one of the setup items may be employed to satisfy the setup requirement. Based on the setup requirement information, the icon 158 is displayed for each setup requirement. For example, the setup requirement information may include five (5) setup requirements: a setup requirement for tray, in which printable sheets are stored; a setup requirement for sheet size; a setup requirement for sheet type; a setup requirement for printable colors; and a setup requirement for side(s) of the sheet to be printed. In such a case, five (5) icons 158, each of which corresponds to one of the five setup requirements, may be displayed. More specifically, an icon 158a, through which a tray containing the printable sheets to be used may be designated; an icon 158b, through which a size of the sheets to be used to print the image may be designated; an icon 158c, through which a sheet type to be used to print the image may be designated; an icon 158d, through which printable colors to be used to print the image may be designated; and an icon 158e, through which side(s) of a sheet to be printed may be designated, may be displayed.

While image data for the icons 158 are stored in the data storage area 26, the image data for the icons 158 may as well be stored in the external devices, including the MFP 32. If the image data for the icons 158 is stored in the external device, the image data for the icons 158 may be obtained by the PC 10 along with the setup requirement information when the PC 10 obtains the setup requirement information from the selected device. If the image data for the icons 158 is not stored in the selected device, and the PC 10 obtains no image data for the icon 158 from the selected device, the PC 10 may display the icons 158 based on the image data of the icons 158 stored in the own data storage area 26. In the meantime, image data for icons 170 (see FIG. 7), which will be described later, may be stored in the data storage 26 as well as the image data for the icons 158, but may as well be stored in the external devices and may be obtained from the selected device.

Figure 7:
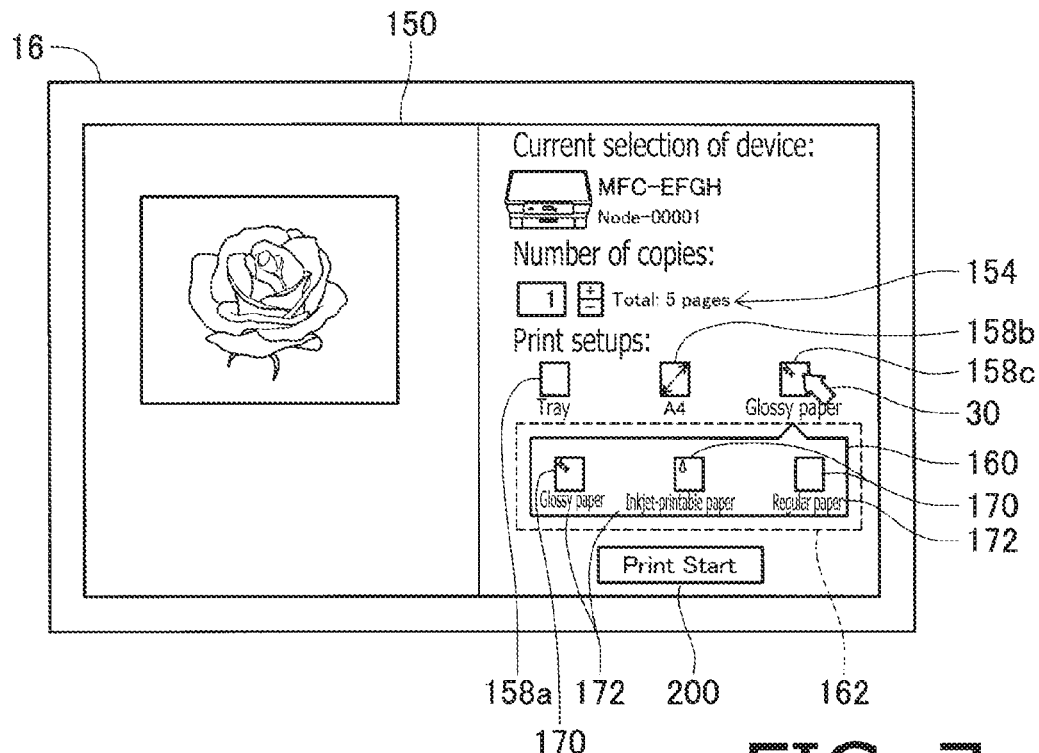
FIG. 7 is another illustrative view of the print requirement setup screen 150 according to the embodiment of the present disclosure.
Figure 8:
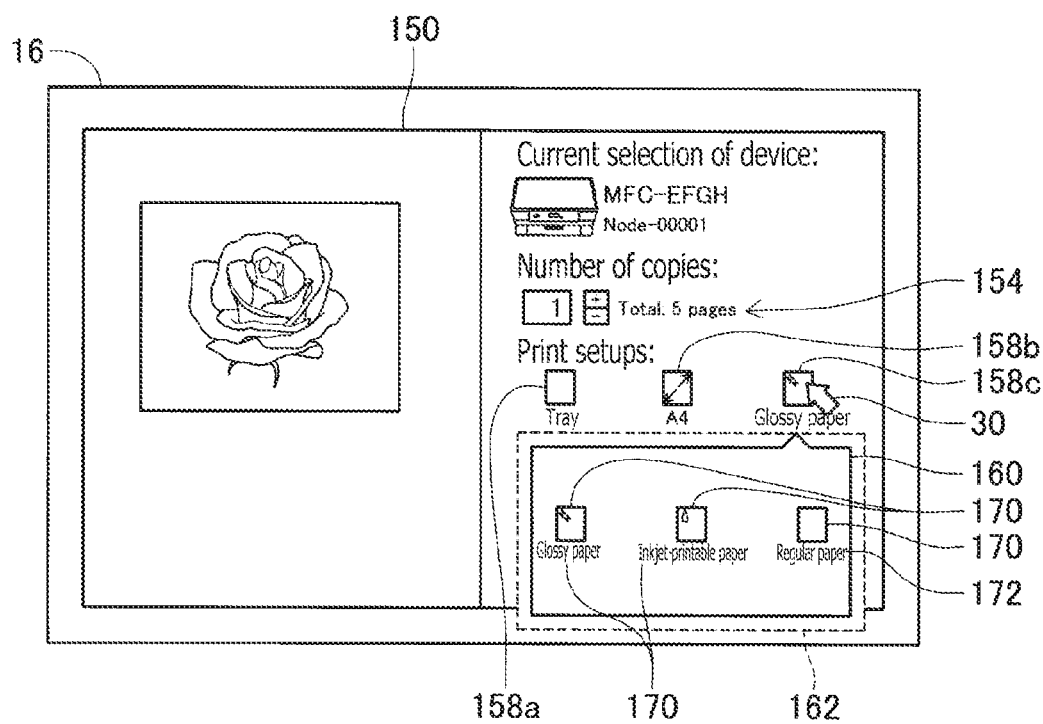
FIG. 8 is another illustrative view of the print requirement setup screen 150 according to the embodiment of the present disclosure.
Figure 9:
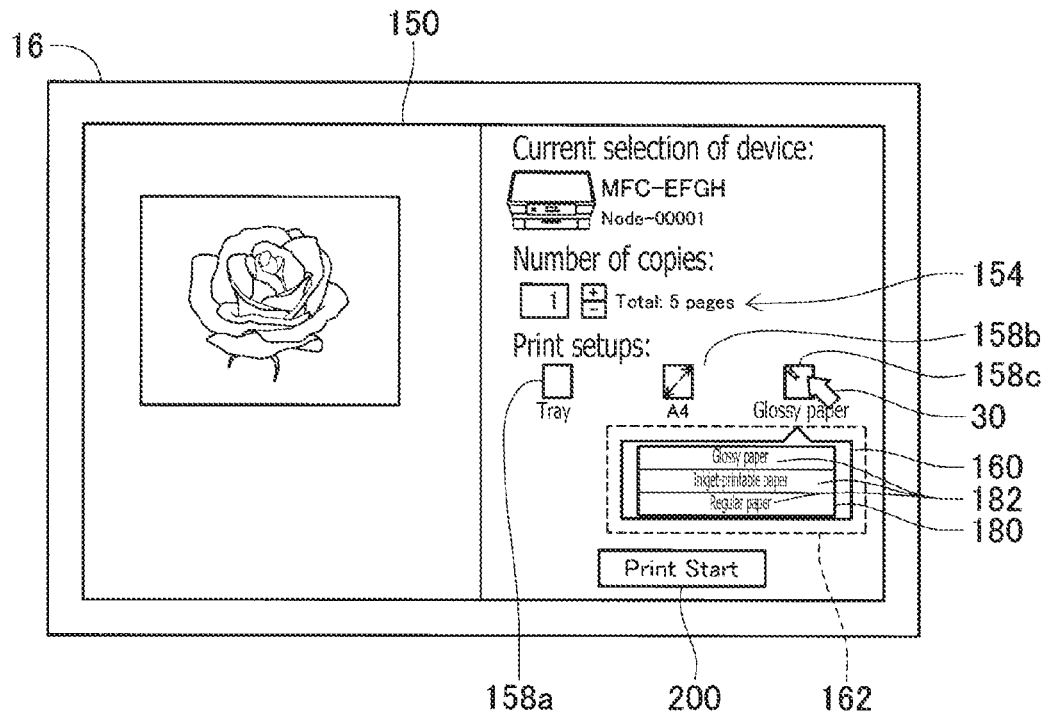
FIG. 9 is another illustrative view of the print requirement setup screen 150 according to the embodiment of the present disclosure.

When one of the icons 158 is operated through the print requirement setup screen 150, in order to designate the setups for printing, a balloon window 160 (FIG. 7) drawn from the operated icon 158 is displayed. The balloon window 160 is displayed inside a balloon display area 162, which may be spared below the operated icon 158, as enclosed by a broken line in FIG. 7. The balloon window 160 may be resized to enlarge or diminish by an operation through the mouse. For example, the user may place the cursor 30 at a lower edge of the balloon window 160, click and hold down the left button of the mouse, and move the mouse with the left button being held down to move the cursor 30 downward, or closer to the user. Thus, the lower edge of the balloon window 160 may move, as shown in FIG. 8 so that the balloon window 160 may be enlarged. While being enlarged, the balloon display area 162 containing the balloon window 160 may be enlarged as well. In this regard, the balloon window 160 being enlarged may spread out beyond an outline of the print requirement setup screen 150. For another example, the user may place the cursor 30 at a leftward edge of the balloon window 160 shown in FIG. 7, click and hold down the left button of the mouse, and move the mouse with the left button being held down to move the cursor 30 rightward. Thus, as shown in FIG. 9, the leftward edge of the balloon window 160 may move rightward so that the balloon window 160 may be diminished. While being diminished, the balloon display area 162 containing the balloon window 160 may be diminished as well. Thus, the balloon window 160 may be resized by the dragging operation to the edge of the balloon window 160.

In the balloon window 160, one or more setup items may be displayed, depending on the setup requirement corresponding to the operated icon. The setup items may be displayed in an icon format or in a list format. The icon format is a method to display the setup item in a figurative image containing a symbolic figure that may represent the setup item. For example, the setup requirement for sheet type may include three (3) options of setup items: glossy paper, inkjet-printable paper, and regular paper. Therefore, when, for example, the icon 158c to designate the sheet type is operated, and when the setup items for the setup requirement corresponding to the operated icon 158c are to be displayed in the icon format, as shown in FIG. 7, three (3) icons 170 corresponding to the setup items of glossy paper, inkjet-printable sheet, and regular paper, respectively, may be displayed in the balloon window 160. Each of the icons 170 corresponding to the setup items of glossy paper, inkjet-printable sheet, and regular paper, respectively, may be represented by figures that may invoke content of each setup item. For example, the icon 170 corresponding to the setup item of glossy paper may be represented by a figure that may invoke gloss, and the icon 170 corresponding to the setup item of inkjet-printable sheet may be represented by a figure that may invoke a droplet of ink. Thereby, the user may grasp features of the setup items intuitively and promptly. Meanwhile, each setup item displayed in the icon format may be accompanied by an item name 172, which describes the setup item in text, at a lower position with respect to the icon 170. In this regard, the icon 170 may be displayed in larger dimensions to occupy a larger area than the item name 172.

On the other hand, the list format is a method to display the setup item mainly in a textual image containing text describing the setup item. Specifically, the text may be based on a name of the setup item. For example, when the icon 158c to designate the sheet type is operated, and when the setup items for the setup requirement corresponding to the operated icon 158c are to be displayed in the list format, a display area 180 (FIG. 9) may be displayed in the balloon window 160. The display area 180 may be divided into three (3) fields, in which item names 182 describing the three setup items of glossy paper, inkjet-printable paper, and regular paper, are respectively displayed.

Displaying a setup item by the icon 170 may not necessarily be limited to displaying the icon 170 alone but may include displaying the icon 170 accompanied by the text to describe the item name. Similarly, displaying a setup item mainly by the item name 182 may not necessarily be limited to displaying the item name 182 alone but may include displaying the item name 182 accompanied by an icon. In other words, when the setup items are displayed in the icon format, either the icons 170 alone or the icons 170 accompanied by the item names 172 (see FIG. 7) may be displayed. In this regard, when the icons 170 accompanied by the item names 172 are displayed, the icons 170 should be displayed in larger dimensions than the item names 172. When the setup items are displayed in the list format, either the item names 182 alone or the item names 182 accompanied by the icons may be displayed. In this regard, when the item names 182 accompanied by the icons are displayed, the item names 182 should be displayed in larger dimensions than the icons.

The icons 170 displayed in the balloon window 160 may move according to the resizing operation to the balloon window 160. Specifically, when the balloon window 160 is enlarged to spread beyond the outline of the print requirement setup screen 150, some of the icons 170 may move to be displayed beyond the outline of the print requirement setup screen 150.

When the setup items are displayed in the balloon window 160, the setup items may be displayed in either the icon format or the list format depending on a quantity of the setup items to be presented. For example, when the icon 158c to designate the sheet type is operated, one or more setup items that may satisfy the setup requirement may be obtained from the setup requirement information, and a quantity of the setup item(s) may be specified. Thereafter, dimensions of the balloon window 160 to occupy in the print requirement setup screen 150 may be calculated. Further, capacity of the balloon window 160, i.e., whether all of the obtained setup items may be displayed in the icon format inside the balloon window 160, is determined.

Specifically, the data storage area 26 stores in advance dimensions of an area, in which a setup item including an icon 170 and an item name 172 may be displayed. Therefore, the dimensions of the area for a setup item is multiplied by the quantity of the setup items, and the product of the multiplication is compared to the dimensions of the balloon window 160. Thus, smallness or largeness of the dimensions of the area, in which the setup items may be displayed in the icon format, compared to the dimensions of the balloon window 160 is determined. If the product is smaller than the dimensions of the balloon window 160, it may be determined that all of the setup items may be displayed in the icon format within the balloon window 160. Based on the determination, as shown in FIG. 7, the setup items may be displayed inside the balloon window 160 in the icon format. In this regard, the icons 170 may be displayed based on the image data obtained from the selected device when the image data for the icon 170 has been obtained from the selected device or may be displayed based on the image data stored in the data storage area 26 when the image data is not supplied by the selected device.

Figure 10:
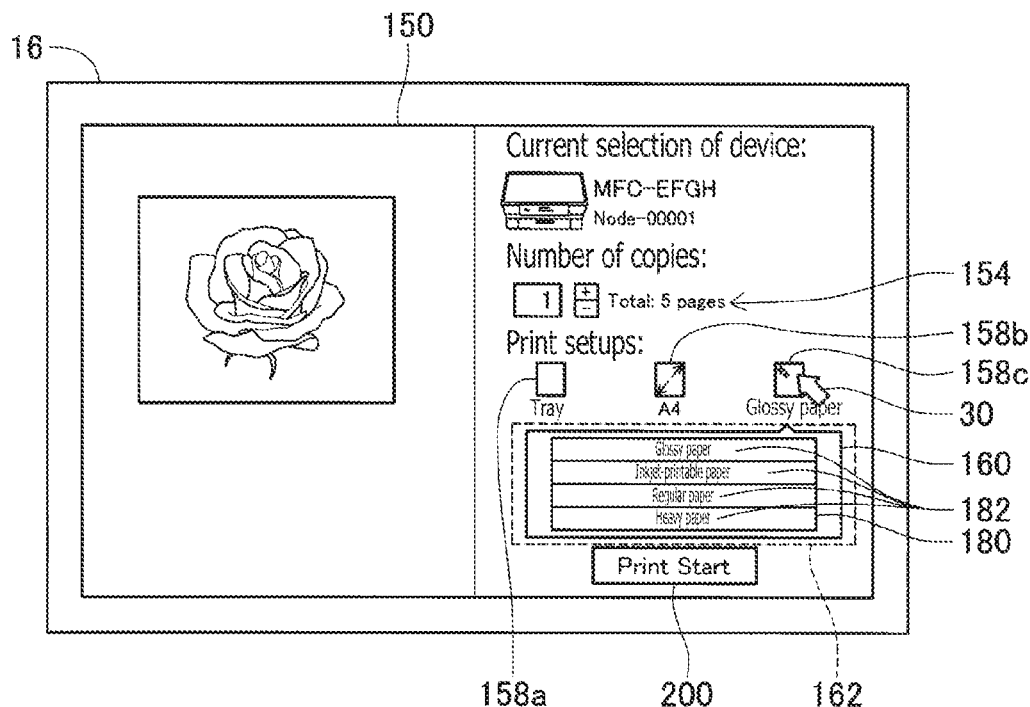
FIG. 10 is another illustrative view of the print requirement setup screen 150 according to the embodiment of the present disclosure.

On the other hand, when the product of the multiplication is greater than the dimensions of the balloon window 160, it may be determined that not all of the setup items may be displayed in the icon format within the balloon window 160. Based on the determination, as shown in FIG. 10, the setup items may be displayed in the list format to fit in the balloon window 60.

For example, when the setup requirement for the sheet type includes three (3) setup items, which are glossy paper, inkjet-printable paper, and regular paper, a product of the dimensions of the area for a setup item multiplied by three may be smaller than the dimensions of the balloon window 160. Therefore, it may be determined that all of the three setup items may be displayed in the icon format in the balloon window 160. Accordingly, the three setup items may be displayed in the icon format inside the balloon window 160. On the other hand, when the setup requirement for the sheet type includes four (4) setup items, which are glossy paper, inkjet-printable paper, regular paper, and heavy paper, a product of the dimensions of the area for a setup item multiplied by four may be larger than the dimension of the balloon window 160. Therefore, it may be determined that not all of the four setup items may be displayed in the icon format in the balloon window 160. Accordingly, the four setup items may be displayed in the list format to fit in the balloon window 160.

Thus, in the PC 10, when all of the setup items are determined to fit in the balloon window 160 in the icon format, the setup items are displayed in the icon format inside the balloon window 160. When all of the setup items should fit in the balloon window 160 in the icon format, the quantity of the setup items may often be smaller. Therefore, the user may grasp implication of the setup items promptly and intuitively. On the other hand, when not all of the setup items should fit in the balloon window 160 in the icon format, the setup items may be displayed in the list format in the balloon window 160. When not all of the setup items should fit in the balloon window 160 in the icon format, the quantity of the setup items may often be larger. Therefore, the user may read through the display area 180 to grasp the presented options of the setup items. Thus, the options of the setup items may be displayed in the preferable format, and usability may be improved.

Meanwhile, the conventional information processing apparatus may allow a user to select the format to display the setup items through the user's operation. For example, a button, through which the user's preference of the format between the icon format and the list format may be entered, may be displayed. The user may operate the button to enter the preference of the format to display the setup items. However, an unexperienced user may be bothered, confused, or burdened by such an operation to the button. In contrast, according to the PC 10 in the embodiment described above, the format to display the setup items may be automatically determined depending on the quantity of the setup items and displayed according to the determination. Therefore, the setup items may be displayed in the preferable format, and the user may be released from the burden.

It may be recognized that the setup requirement information may be obtained not only when the user operates the OK button 148 through the image selector screen 140 but also may be obtained from the selected device at predetermined timing, for example, periodically. Therefore, the setup requirement information may be obtained from the selected device while the setup items are being displayed in the print requirement setup screen 150. In such a case, the quantity of the setup items contained in the setup requirement information may change, and the format to display the setup items may need to be changed.

For example, there may be a case that the setup requirement information is obtained from the selected device and updated while the setup items are being displayed in the icon format. In such a case, it may be necessary to determine whether all of the setup items included in the updated setup requirement information may be displayed to fit within the balloon window 160 in the icon format. When all of the setup items included in the updated setup requirement information is determined to be displayed within the balloon window 160 in the icon format, all of the setup items may continuously be displayed in the icon format in the balloon window 160.

On the other hand, when the quantity of the setup items increases, and when it is determined that not all of the setup items included in the updated setup requirement information should fit within the balloon window 160 in the icon format, the format to display the setup items may be changed to the list format. Thus, when the quantity of the setup items increases, the setup items may be displayed in the preferable format.

Meanwhile, it may be preferable that the displaying formats should be restrained from changing frequently. Therefore, when the setup requirement information is updated while the setup items are being displayed in the list format based on the quantity of the setup items, and the quantity of the setup items decreases, the format to display the setup items may not be changed to the icon format but may be maintained in the list format. For example, when the setup requirement information is updated while the setup items are being displayed in the list format based on the quantity of the setup items, whether all of the setup items included in the updated setup requirement information should be displayed in the icon format to fit inside the balloon window 160 may be determined. If it is determined that not all of the setup items should be displayed in the icon format to fit in the balloon window 160, the list format to display the setup items may be maintained so that all of the setup items included in the updated setup requirement information may be displayed in the list format.

On the other hand, even if it is determined that all of the setup items should be displayed in the icon format to fit in the balloon window 160, the format to display the setup items may be still maintained in the list format so that all of the setup items included in the updated setup requirement information may continuously be displayed in the list format. Thus, the change of the displaying formats while the setup items are being displayed in the list format may be restrained.

Figure 11:
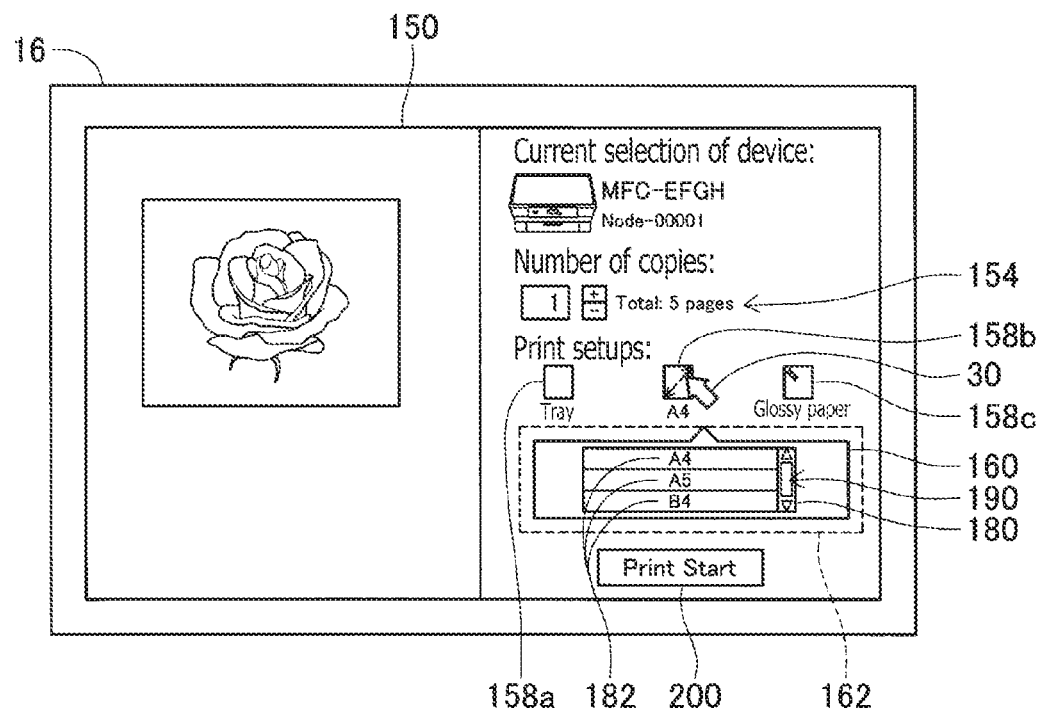
FIG. 11 is another illustrative view of the print requirement setup screen 150 according to the embodiment of the present disclosure.

Meanwhile, some of the setup requirement may include setup items that may be recognizable more easily in the list format than in the icon format. For example, options of the setup items concerning the setup requirement for sheet size may include varied sizes such as A3, A4, letter, and legal, but it may be difficult to recognize the different sheet sizes by figures of the icons. Therefore, even if the setup items for the sheet sizes are displayed in the icon format, the user may try to read the item names 172, which are auxiliary displayed to be smaller than the icons 170, to recognize the sheet sizes, or the user may find it difficult to read the icon names 172 displayed in the smaller dimensions. In contrast, the setup items displayed in the list format, in which the setup names 182 are mainly displayed, may be more easily recognizable. Therefore, the setup items for the sheet size may be displayed in the list format, as shown in FIG. 11, regardless of the quantity of the setup items. In other words, the format to display the setup items concerning the setup requirement for sheet size may be fixed to the list format in advance by the controlling program 24.

In this regard, the setup requirement for the sheet size may have a relatively large quantity of setup items including, for example, A4, A5, B4, and B5. Thus, when the setup requirement includes a large quantity of setup items, not all the setup items may be displayed to fit in the display area 180 simultaneously, even in the list format. In such a case, a scroll bar 190 may be displayed on, for example, a rightward end of the display area 180. With the scroll bar 190 in the display area 180, a part of the setup items for the setup requirement may be displayed, and the user may operate the scroll bar 190 so that the display area 180 may scroll, and another part of the setup items may be displayed in the display area 180 in response to the scrolling operation to the scroll bar 190.

On the other hand, some of the setup requirements may include setup items that may be recognizable more easily in the icon format than in the list format. For example, a setup requirement for print colors may include setup items of multicolor and monochrome, and the icon 170 corresponding to the setup item of multicolor printing may be presented in a figure drawn in a plurality of colors such as red and blue, while the icon 170 corresponding to the monochrome printing may be presented in a figure drawn in black and white. Thereby, the user may recognize the setup items for the print colors intuitively and promptly by the icons 170 displayed in the different colors. However, if the setup items concerning the setup requirement for print colors are displayed in the list format with the item name 182, in which the setup items are described in text, it may be more difficult to recognize the setup items intuitively or promptly. Therefore, the setup items concerning the setup requirement of print colors may be displayed in the icon format regardless of the quantity of the setup items. In other words, the format to display the setup items for the print colors requirement may be fixed to the icon format in advance by the controlling program 24.

Figure 12:
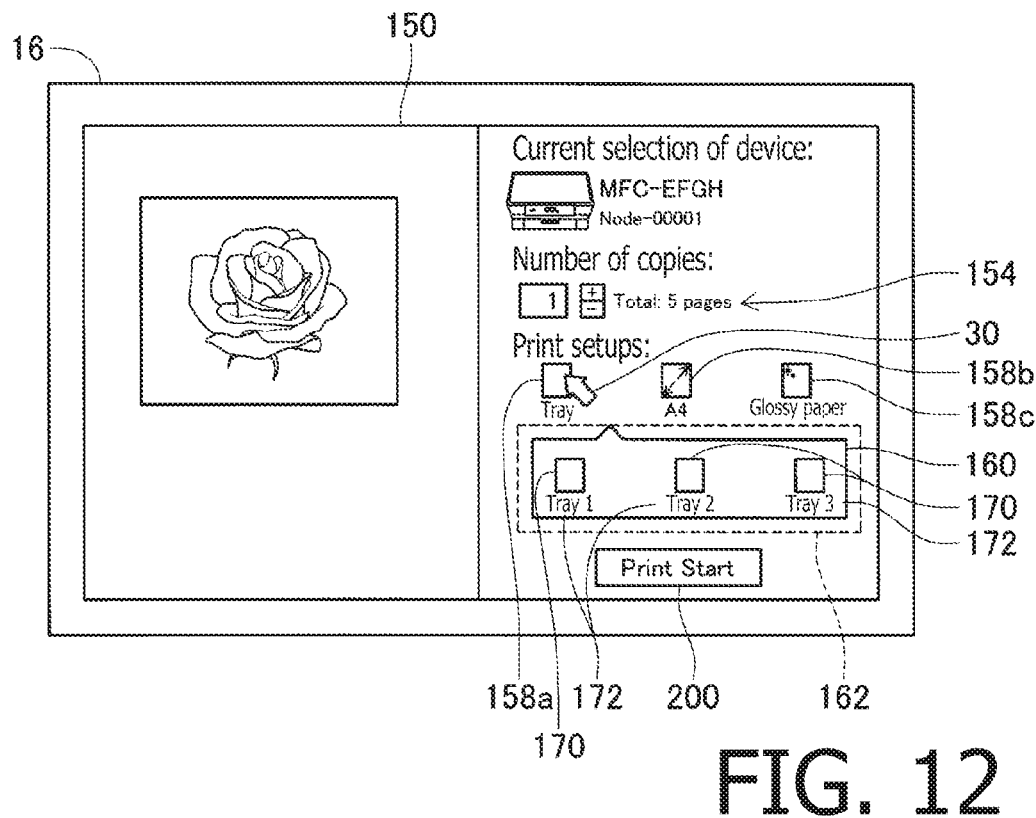
FIG. 12 is another illustrative view of the print requirement setup screen 150 according to the embodiment of the present disclosure.
Figure 13:
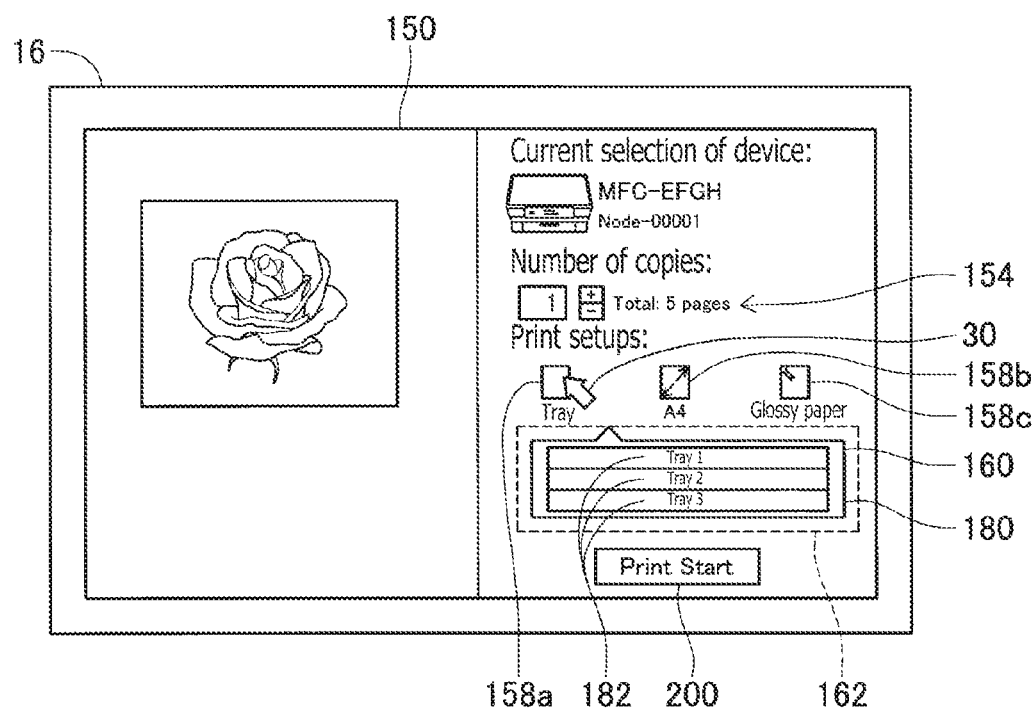
FIG. 13 is another illustrative view of the print requirement setup screen 150 according to the embodiment of the present disclosure.

Further, some of the setup requirements may include setup items that may be selectively displayed in one of the icon format and the list format based on figures in the icons 170. For example, a setup requirement for tray, which requires designation of a tray to store the sheets to be used, may include setup items of specific trays named, for example, Tray 1 and Tray 2. However, it may be difficult to invoke the specific tray between Tray 1 and Tray 2 to the user by figures of the icons. In this regard, the icons 170 for the setup items concerning the setup requirement for tray stored in the data storage area 26 may not be drawn by different figures but may be drawn in a same figure. For example, the setup items concerning the setup requirement for tray displayed in the icon format may all be presented in the icons 170 in the same figure in the balloon window 160 (see FIG. 12). Therefore, the user may not recognize the setup items by the icons 170 but may attempt to recognize the setup items by the item name 172 appended to the icons 170. Meanwhile, the item names 172 may be displayed in the smaller dimensions, in which the user may find difficult to read. In contrast, if the setup item concerning the setup requirement for tray is displayed in the list format, as shown in FIG. 13, the item names 182 are mainly displayed, and the user may recognize the setup items by the item names 182. Thus, the icons 170 provided with the identical figure may be effectively displayed in the list format.

In the meantime, the image data for the icons 170 may be, as mentioned above, obtained from the selected device. Some of the obtained image data for the icons 170 from the selected device may contain specific image data for figures that are specific to the setup items, and the icons 170 based on the specific image data may be drawn in different figures. Thus, when the icons 170 are provided with different figures, the user may identify the setup items by the appearance of the icons 170; therefore, the icon format to display the setup items may be effective.

In consideration of this, in order to determine the displaying format to display the setup items concerning the setup requirement for tray, the image data for the icons 170 to be displayed may be specified, and identicalness of the figures of the icons 170 may be determined based on the image data. When the figures of the icons 170 are identical among the setup items, the setup items may be displayed in the list format regardless of the quantity of the setup items. On the other hand, when the figures of the icons 170 are not identical but are different among the setup items, the displaying format may be determined between the icon format and the list format based on the quantity of the setup items according to the procedure described above. The setup items may be thereafter displayed in the determined format. Thus, the setup items may be displayed in consideration of the figures of the icons 170.

[Controlling Program]

The setup items may be displayed in the print requirement setup screen 150 by the CPU 12 executing the controlling program 24. Below will be described a flow of steps to be executed by the CPU 12 according to the controlling program 24 with reference to FIGS. 14 and 15.

Figure 14:
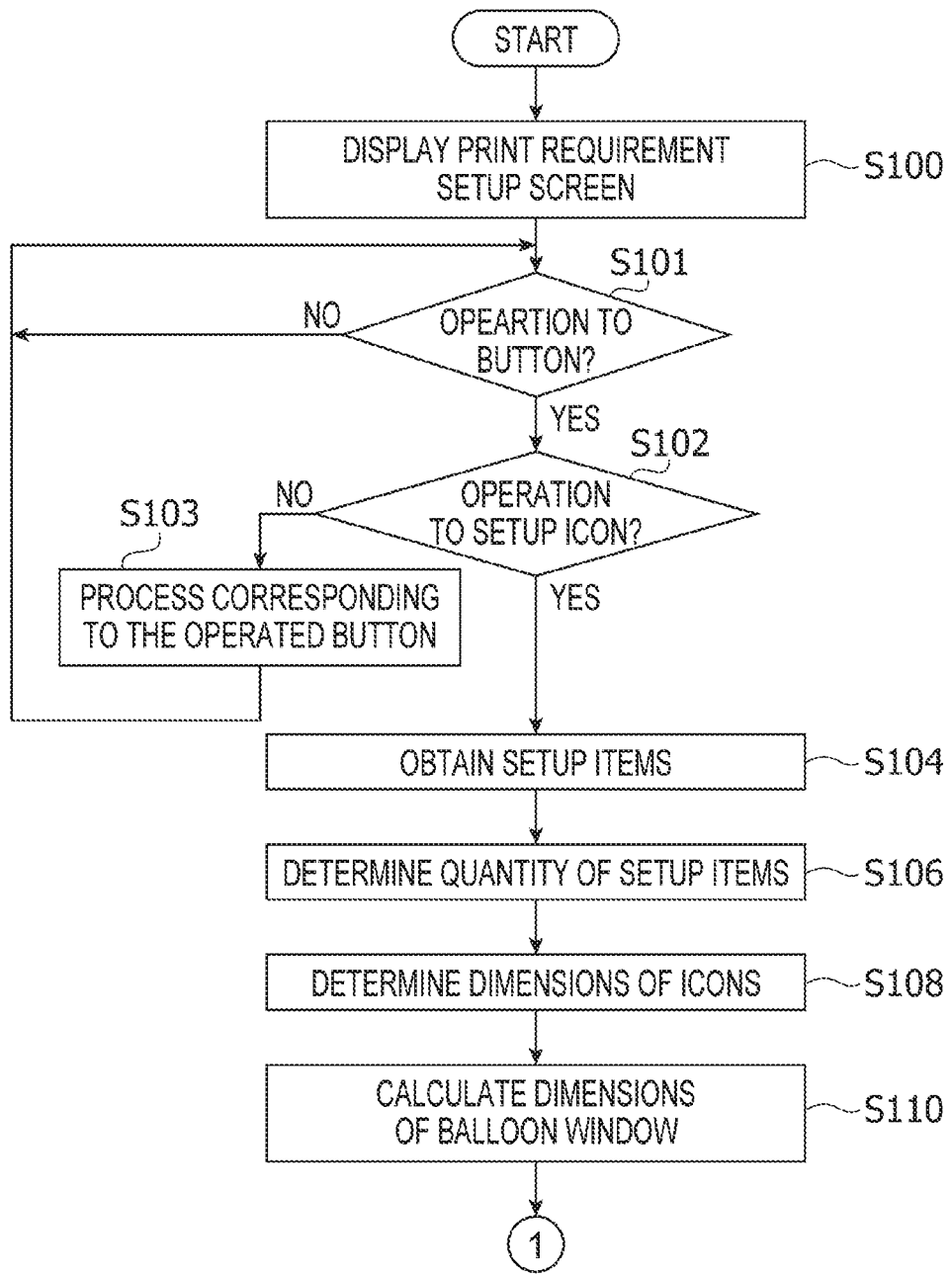
FIG. 14 is a flowchart to illustrate a flow of steps to be executed in a personal computer (PC) 10 according to the embodiment of the present disclosure.

The flow may be activated when the OK button 148 is operated through the image selector screen 140. As shown in FIG. 14, in S100, the print requirement setup screen 150 is displayed in the display 16. Next, in S101, the CPU 12 determines whether any of the buttons, including the icons 158, displayed in the print requirement setup screen 150 is operated. If no button is operated (S101: NO), the process in S101 is repeated. When any of the buttons is operated (S101: YES), in S102, the CPU 12 determines whether the operation was to one of the icons 158, through which a setup item should be designated.

If the operation was not to the icons 158 (S102: NO), in S103, the CPU 12 executes a process corresponding to the operated button. The flow returns to S101. If the operation was to one of the icons 158 (S102: YES), in S104, the setup items for the setup requirement in the setup requirement information corresponding to the operated one of the icons 158 is obtained. In this regard, after once obtaining the setup requirement information based on the operation to the OK button 148 through the image selector screen 140, if updating setup requirement information is further obtained, the setup requirement corresponding to the operated icon is determined based on the setup requirement contained in the updated setup requirement information, and the setup item (s) to satisfy the setup requirement is obtained. On the other hand, after once obtaining the setup requirement information based on the operation to the OK button 148 through the image selector screen 140, if no updating setup requirement information is further obtained, the setup requirement corresponding to the operated icon 158 is determined based on the setup requirement contained in the data storage area 26, and the setup item(s) to satisfy the setup requirement is obtained.

Figure 15:
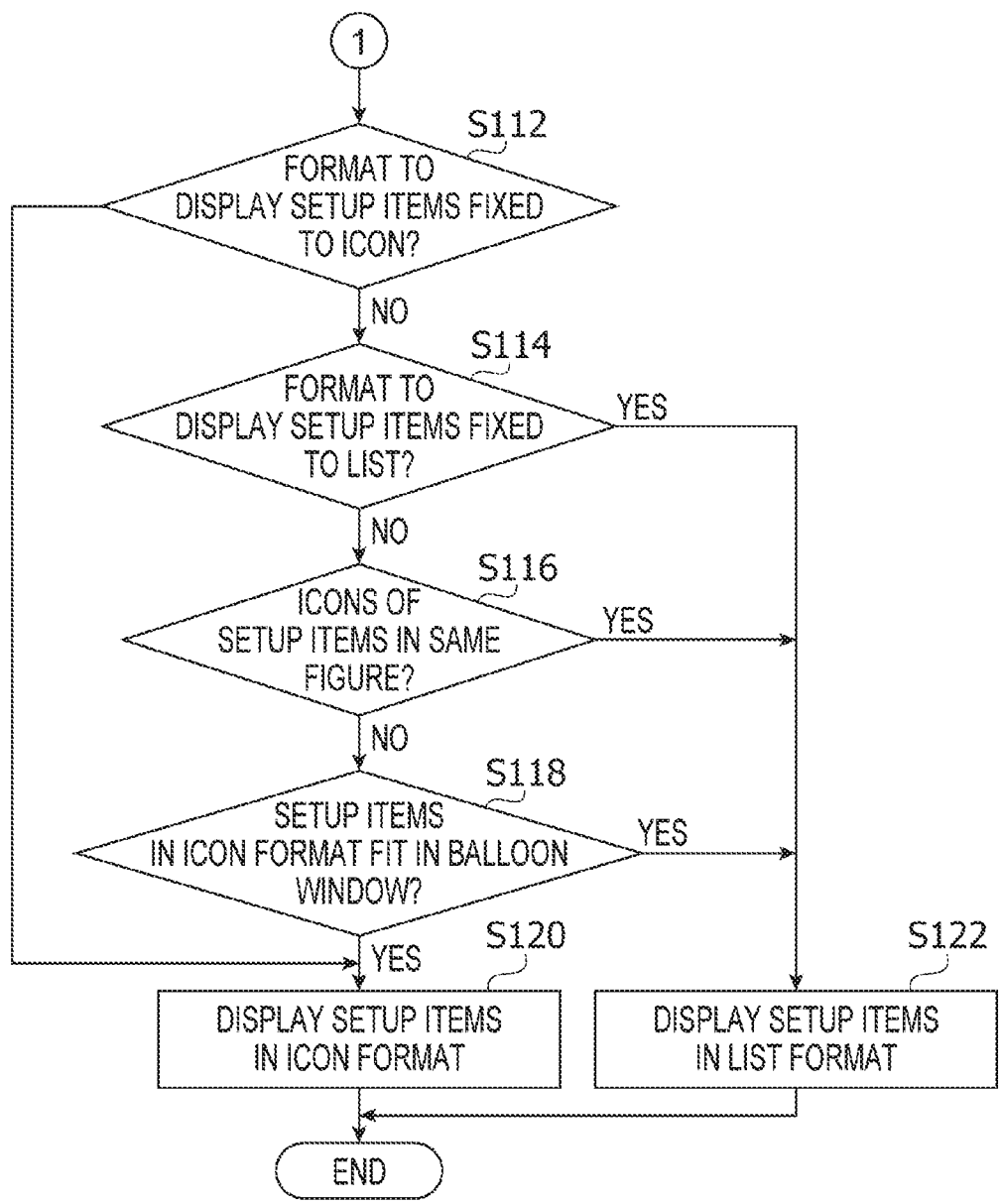
FIG. 15 is a flowchart to illustrate a flow of steps to be executed in the PC 10 according to the embodiment of the present disclosure.

Next, in S106, a quantity of the obtained setup item(s) is determined. In S108, dimensions required for the icons 170 to be displayed in the print requirement setup screen 150 is determined. Thereafter, in S110, dimensions of the balloon window 160 is calculated. Further, in S112, as shown in FIG. 15, the CPU 12 determines whether the displaying format to display the setup items is fixed to the icon format. If the displaying format is fixed to the icon format (S112: YES), in S120, the setup items are displayed in the icon format. The flow ends thereat. On the other hand, if the displaying format to display the setup items is not fixed to the icon format (S112: NO), in S114, the CPU 12 determines whether the displaying format to display the setup items is fixed to the list format. If the displaying format is fixed to the list format (S114: YES), in S122, the setup items are displayed in the list format. The flow ends thereat. In this regard, whether the displaying format to display the setup items is fixed to the icon format or the list format is described in the controlling program 24 in advance so that the CPU 12 may refer to the controlling program 24 to make the determination.

Meanwhile, if the displaying format to display the setup items is not fixed to the list format (S114: NO), in S116, the CPU 12 determines whether the figures of the icons 170 to be displayed are the same. Whether the figures of the icons 170 are the same or not may depend on a location where the image data for the icons 170 is stored. For example, when the image data for the icons 170 is stored in the data storage area 26, identicalness of the figures of the icons 170 may be determined by a path and/or a name of a file containing the image data. On the other hand, when the image data for the icons 170 is obtained from the selected device, identicalness of the figures of the icons 170 may be determined by location information such as a uniform resource locator (URL), from which the image data for the icons 170 is obtained. In S116, if the figures of the icons 170 to be displayed are identical (S116: YES), in S122, the setup items are displayed in the list format. The flow ends thereat.

When the setup requirement information is obtained and updated while the print requirement setup screen 150 is being displayed, the displaying format to display the setup items may be determined between the list format and the icon format based on the setup items contained in the updated setup requirement information. In other words, the process in S118 is executed. In this regard, whether the setup items are currently displayed in the list format or the icon format in the print requirement setup screen 150 is determined. If the setup items are currently being displayed in the print requirement setup screen 150 in the list format, and if the setup items according to the updated setup requirement information are determined to be displayed in the icon format, the setup items contained in the updated setup requirement information are displayed in the list format. Meanwhile, if the setup items are currently being displayed in the print requirement setup screen 150 in the icon format, and if the setup items according to the updated setup requirement information are determined to be displayed in the icon format, the setup items contained in the updated setup requirement information are displayed in the icon format.

Although an example of carrying out the disclosure have been described, those skilled in the art will appreciate that there are numerous variations and permutations of the controlling program and the information processing apparatus that fall within the spirit and scope of the disclosure as set forth in the appended claims. It is to be understood that the subject matter defined in the appended claims is not necessarily limited to the specific features or act described above. Rather, the specific features and acts described above are disclosed as example forms of implementing the claims.

For example, the setup items to be displayed in the list format may not necessarily be limited to the item names 182, but images of figures that may represent the setup items for the setup requirement may be appended to the item names 182. In such a configuration, the item names 182 should be displayed in larger dimensions than the figures.

For another example, the present disclosure may not necessarily be implemented by the controlling program 24 that is run on the PC 10 but may be implemented by the controlling program 24 provided to any device and running on the device.

For another example, the balloon window 160 may not necessarily be resized by the dragging operation to the edge thereof but may be resized by a dragging operation to a line that divides the print requirement screen 150 into two areas: the setup designating area on the right-hand side and the preview area on the left-hand side. For another example, the balloon window 160 may be resized by a dragging operation to an edge of the print requirement setup screen 150 to resize the printer requirement setup screen 150 so that the balloon window 160 may be resized according to the changed size of the print requirement setup screen 150.

For another example, the processes shown in FIGS. 13-14 may not necessarily be executed by the CPU 12, but the processes and steps described in the above embodiment may be implemented by a single CPU 12, a plurality of CPUs 21, a hardware such as an ASIC, a logic integrated circuit, and/or a combination of these that may work in conjunction with one another.

What is claimed is:

1. A non-transitory computer readable medium storing computer readable instructions that are executable by a computer in an information processing apparatus comprising a display device, a communication interface configured to communicate with an external device and a memory configured to store information concerning a plurality of setting parameters obtained from the external device; the computer readable instructions, when executed by the computer, causing the computer to:
   determine a single format to display a plurality of setting parameters in the display device based on how many setting parameters are to be displayed simultaneously in the display device, each of the plurality of setting parameters being a setting option for a setting item required in order to accomplish a predetermined process, between an icon format, in which the plurality of setting parameters are displayed in figurative images containing symbolic figures representing the plurality of setting parameters, and a list format, in which the plurality of setting parameters are displayed in textual images containing text describing the plurality of setting parameters;
   obtain information concerning the plurality of setting parameters from the external device; and
   control the display device to display the plurality of setting parameters in the single format being one of the icon format and the list format;
   wherein while the plurality of setting parameters are being displayed in the icon format, when a quantity of the plurality of setting parameters specified by the information concerning the plurality of setting parameters obtained from the external device increases to be larger than a quantity of the plurality of setting parameters specified by the information concerning the plurality of setting parameters stored in the memory, and when the single format to display the plurality of setting parameters is determined to be changed to the list format according to the increase of the quantity of the plurality of setting parameters, control the display device to display the plurality of setting parameters in the list format; and
   wherein while the plurality of setting parameters are being displayed in the list format, when the quantity of the plurality of setting parameters specified by the information concerning the plurality of setting parameters obtained from the external device decreases to be smaller than the quantity of the plurality of setting parameters specified by the information concerning the plurality of setting parameters stored in the memory, and even when the single format to display the plurality of setting parameters is determined to be changed to the icon format according to the decrease of the quantity of the plurality of setting parameters, control the display device to continue displaying the plurality of setting parameters in the list format.

2. The non-transitory computer readable medium according to claim 1,
   wherein the computer readable instructions further cause the computer to:
   control the display device to display the plurality of setting parameters in a predetermined display area; and
   determine to display the plurality of setting parameters in the icon format when dimensions of the plurality of setting parameters to be displayed in the icon format are smaller than dimensions of the predetermined display area, and determine to display the plurality of setting parameters in the list format when dimensions of the plurality of setting parameters to be displayed in the list format are larger than the dimensions of the predetermined display area.

3. The non-transitory computer readable medium according to claim 2,
   wherein the computer readable instructions further cause the computer to determine one of smallness and largeness of the dimensions of the plurality of setting parameters to be displayed in the icon format compared to dimensions of the predetermined display area based on dimensions of the figurative images and the quantity of the plurality of setting parameters.

4. The non-transitory computer readable medium according to claim 1,
   wherein the computer readable instructions further cause the computer to:
   control the display device to display a setup screen, through which the plurality of setting parameters are designative; and
   control the display device to display the plurality of setting parameters inside the setup screen.

5. The non-transitory computer readable medium according to claim 4,
wherein the computer readable instructions further cause the computer to control the display device to display a part of the plurality of setting parameters inside the setup screen and another part of the plurality of setting parameters beyond an outline of the setup screen.

6. The non-transitory computer readable medium according to claim 1,
wherein the computer readable instructions further cause the computer to determine to display the plurality of setting parameters in the list format regardless of a quantity of the plurality of setting parameters if the plurality of setting parameters are provided with an identical figurative image.

7. The non-transitory computer readable medium according to claim 1, wherein the external device accomplishes the predetermined process.

8. The non-transitory computer readable medium according to claim 1,
wherein the computer readable instructions further cause the computer to control the display device to display a part of the plurality of setting parameters in the display device, and to display another part of the plurality of setting parameters in the display device in response to a predetermined operation.

9. The non-transitory computer readable medium according to claim 1,
wherein the computer readable instructions further cause the computer to:
when the plurality of setting parameters are displayed in the icon format in the figurative images accompanied by the textual images, control the figurative images to be displayed in larger dimensions than dimensions of the textural images; and
when the plurality of setting parameters are displayed in the list format in the textual images accompanied by the figurative images, control the textual images to be displayed in larger dimensions than dimensions of the figurative images.

10. An information processing apparatus, comprising:
a display device;
a communication interface configured to communicate with an external device;
a memory configured to store information concerning a plurality of setting parameters obtained from the external device; and
a controller configured to:
determine a single format to display plurality of setting parameters in the display device based on how many setting parameters are to be displayed simultaneously in the display device, each of the plurality of setting parameters being a setting option for a setting item required in order to accomplish a predetermined process, between an icon format, in which the plurality of setting parameters are displayed in figurative images containing symbolic figures representing the plurality of setting parameters, and a list format, in which the plurality of setting parameters are displayed in textual images containing text describing the plurality of setting parameters;
obtain information concerning the plurality of setting parameters from the external device; and
control the display device to display the plurality of setting parameters in the single format being one of the icon format and the list format;
wherein while the plurality of setting parameters are being displayed in the icon format, when a quantity of the plurality of setting parameters specified by the information concerning the plurality of setting parameters obtained from the external device increases to be larger than a quantity of the plurality of setting parameters specified by the information concerning the plurality of setting parameters stored in the memory, and when the single format to display the plurality of setting parameters is determined to be changed to the list format according to the increase of the quantity of the plurality of setting parameters, control the display device to display the plurality of setting parameters in the list format; and
wherein while the plurality of setting parameters are being displayed in the list format, when the quantity of the plurality of setting parameters specified by the information concerning the plurality of setting parameters obtained from the external device decreases to be smaller than the quantity of the plurality of setting parameters specified by the information concerning the plurality of setting parameters stored in the memory, and even when the single format to display the plurality of setting parameters is determined to be changed to the icon format according to the decrease of the quantity of the plurality of setting parameters, control the display device to continue displaying the plurality of setting parameters in the list format.

\* \* \* \* \*